(12) United States Patent
Ji et al.

(10) Patent No.: US 9,686,750 B2
(45) Date of Patent: Jun. 20, 2017

(54) METHODS AND APPARATUS FOR POWER CONSUMPTION MANAGEMENT DURING DISCONTINUOUS RECEPTION

(71) Applicant: Apple Inc., Cupertino, CA (US)

(72) Inventors: Zhu Ji, San Diego, CA (US); Jason Shi, Pleasanton, CA (US); Johnson Sebini, Fremont, CA (US); Navid Damji, Cupertino, CA (US); Li Su, Cupertino, CA (US)

(73) Assignee: Apple Inc., Cupertino, CA (US)

(*) Notice: Subject to any disclaimer, the term of this patent is extended or adjusted under 35 U.S.C. 154(b) by 688 days.

(21) Appl. No.: 13/623,807

(22) Filed: Sep. 20, 2012

(65) Prior Publication Data

US 2013/0176873 A1 Jul. 11, 2013

Related U.S. Application Data

(60) Provisional application No. 61/585,207, filed on Jan. 10, 2012.

(51) Int. Cl.
*H04L 12/26* (2006.01)
*H04W 52/02* (2009.01)
*H04W 76/04* (2009.01)

(52) U.S. Cl.
CPC ..... *H04W 52/0283* (2013.01); *H04W 76/048* (2013.01); *Y02B 60/50* (2013.01)

(58) Field of Classification Search
CPC . H04W 52/0283; H04W 76/048; Y02B 60/50
USPC ...................................................... 370/252
See application file for complete search history.

(56) References Cited

U.S. PATENT DOCUMENTS

| 5,530,911 | A | | 6/1996 | Lerner et al. | |
|---|---|---|---|---|---|
| 5,712,867 | A | * | 1/1998 | Yokev et al. | 375/136 |
| 5,740,517 | A | | 4/1998 | Aoshima | |
| 8,787,840 | B2 | * | 7/2014 | Srinivasan et al. | 455/69 |
| 2005/0078767 | A1 | * | 4/2005 | Liu | 375/297 |

(Continued)

FOREIGN PATENT DOCUMENTS

| JP | 2009545927 A | 12/2009 |
|---|---|---|
| JP | 2011508487 A | 3/2011 |

(Continued)

OTHER PUBLICATIONS

International Preliminary Report on Patentability, International Application No. PCT/US2013/020887, mailed Jul. 15, 2014.

(Continued)

*Primary Examiner* — Andrew Chriss
*Assistant Examiner* — Ellen Kirillova
(74) *Attorney, Agent, or Firm* — Meyertons, Hood, Kivlin & Goetzel, P.C.

(57) ABSTRACT

Methods and apparatus for adaptively adjusting temporal parameters such as e.g., wake-up times of digital tracking algorithms (such as timing, frequency and power control). In one exemplary embodiment, wake-up times for tracking loops are based on success/error metrics (e.g., Block Error Rate (BLER), Bit Error Rate (BER), Packet Error Rate (PER), Cyclic Redundancy Checks (CRC), etc.) of one or more previous discontinuous reception (DRX) cycles. In a second embodiment, wake-up times for tracking loops are based on residual frequency and timing errors, etc.

12 Claims, 7 Drawing Sheets

(56) References Cited

U.S. PATENT DOCUMENTS

| | | | |
|---|---|---|---|
| 2007/0060095 A1* | 3/2007 | Subrahmanya | H04B 1/7085 455/343.1 |
| 2008/0032662 A1 | 2/2008 | Tu | |
| 2008/0143785 A1 | 6/2008 | Houjou | |
| 2009/0054087 A1* | 2/2009 | Katzir | H04B 1/7117 455/458 |
| 2009/0291656 A1* | 11/2009 | Le Reverend | H04W 52/0229 455/227 |
| 2010/0232488 A1* | 9/2010 | Song | H04B 17/21 375/224 |
| 2010/0317374 A1* | 12/2010 | Alpert et al. | 455/458 |
| 2010/0331019 A1 | 12/2010 | Bhattacharjee et al. | |

FOREIGN PATENT DOCUMENTS

| | | |
|---|---|---|
| KR | 1020100097210 | 8/2012 |
| WO | 2009076634 A1 | 6/2009 |
| WO | 2010033957 A2 | 3/2010 |
| WO | 2010053793 A2 | 5/2010 |
| WO | 2010104980 | 9/2010 |

OTHER PUBLICATIONS

Office Action from Taiwanese Application No. 102100958, issued Oct. 23, 2014, English and Chinese versions, pp. 1-10.
Non-Final Office Action, Japanese Application No. 2014552270, mailed Jun. 29, 2015, 11 pages.
Non-Final Office Action, Korean Application No. 10-20147022174, mailed Jul. 20, 2015, 9 pages.

* cited by examiner

METHODS AND APPARATUS FOR POWER CONSUMPTION MANAGEMENT DURING DISCONTINUOUS RECEPTION

PRIORITY AND RELATED APPLICATIONS

The present application claims priority to U.S. Provisional Patent Application Ser. No. 61/585,207 filed Jan. 10, 2012 and entitled "METHODS AND APPARATUS FOR POWER CONSUMPTION MANAGEMENT DURING DISCONTINUOUS RECEPTION", and is related to U.S. Provisional Patent Application Ser. No. 61/585,209, filed Jan. 10, 2012, entitled "METHODS AND APPARATUS FOR MANAGING RADIO MEASUREMENTS DURING DISCONTINUOUS RECEPTION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of wireless communication and data networks. More particularly, methods and apparatus for managing and improving power consumption during discontinuous reception (DRX) are disclosed.

2. Description of the Related Art

Mobile wireless devices are becoming increasingly full-featured and complex, and accordingly must support multiple modes of operation including for example voice calls, data streaming, and various multimedia applications. As high speed data capability is particularly significant for mobile device users, various technologies have recently been implemented to enhance mobile device capability in this regard. One exemplary high-bandwidth technology is the Long Term Evolution (LTE) wireless communications capability, which has become increasingly pervasive on mobile wireless devices (also referred to as User Equipment, or "UE").

While enhancing data capability, LTE networks also place additional demands on mobile wireless device power consumption. Accordingly, mechanisms exist within LTE-enabled devices to mitigate power consumption. Such mechanisms may enhance user experience by not draining the user's battery at an undesirable rate. One such mechanism within LTE is known as discontinuous reception, or "DRX", and another is discontinuous transmission or "DTX". In LTE networks, the base station (Enhanced NodeB, or "eNB") controls DRX operations using various timers and/or parameters that are communicated to the UE.

LTE communications are further conducted according to a time schedule that includes frames, subframes, and slots. When the UE has a radio resource connection (RRC), the UE can be allocated one or more time slots for communication. If a UE is enabled for DRX operation in RRC connected mode, the UE will wake-up and sleep in accordance with its resource allocations. During RRC idle mode, the UE does not have an active radio resource connection. The UE may periodically wake-up in order to determine whether it is being paged (e.g., UE ID within a frame of data). If the frame does not contain data destined for the UE, the UE may go back to sleep.

Unfortunately, present implementations of the DRX functionality may utilize "wake up" times (intervals) configured based on worst-case component tolerances. Such configuration may provide too generous limits for component wake-up, and therefore may result in excessive energy consumption during each DRX wake-up cycle.

Accordingly, improved methods and apparatus may be useful to further refine and more intelligently schedule operations such as DRX.

SUMMARY

The present disclosure provides, inter alia, improved apparatus and methods for powering components during discontinuous reception.

A method for adaptively managing a component of a mobile device is disclosed. In one embodiment, the method includes: storing, within a memory in the mobile radio communications device, a wake-up time for the tracking loop component; and for each of a plurality of discontinuous reception (DRX) cycles: initializing the tracking loop component using the wake-up time, such that the tracking loop component is powered on for a reception period during the DRX cycle; receiving data during the reception period; measuring performance data for the data received during the reception period; and updating the wake-up time based on the performance data.

In one variant, the one or more temporal parameters of the component comprise a wake-up time of the component.

In another variant, the aforementioned updating is only performed periodically or in an event-driven manner; e.g., after several adjustments have been made.

A mobile device is disclosed. In one embodiment, the mobile device is a long term evolution (LTE) wireless network user equipment (UE) mobile radio communications apparatus comprising a processor, a wireless interface, and power management logic in communication with the processor and the wireless interface, the power management logic configured to manage operation of the mobile device relative to discontinuous reception. In one variant, power management logic is configured to initialize a tracking loop runtime, the initialization characterized by a wake-up time, decoding a logical channel associated with the network, determining an error measure associated with decoding the logical channel, and based on the error measure being less than a target value, reducing the wake-up time.

A computer readable apparatus is disclosed. In one embodiment, the computer readable apparatus has a plurality of computer readable instructions stored thereon, the instructions configured to, when executed by a processor, cause the processor to: obtain a performance measure associated with communicating first data over a wireless link using a parameter; store the performance measure in a storage medium; obtain another performance measure associated with communicating second data over the wireless link using the parameter; and based on a comparison between the another performance measure and the stored performance measure: adjust the parameter; and store the adjusted parameter in the storage medium.

An integrated circuit (IC) is disclosed. In one embodiment, the integrated circuit comprises logic which is configured to implement management of discontinuous channel operation within, e.g., a mobile wireless device.

In another embodiment, the computer readable apparatus comprises a plurality of computer readable instructions configured to, when executed by a processor in a mobile wireless device, cause the mobile wireless device to: obtain a performance measure associated with communicating first data over a wireless link using temporal parameter; store the performance measure in a storage medium; obtain another performance measure associated with communicating additional data over the wireless link using the temporal parameter; and based on a comparison between the another performance measure and the stored performance measure: adjust the temporal parameter; and store the adjusted temporal parameter in the storage medium.

A wireless base station is disclosed. In one embodiment, the wireless base station apparatus comprises one or more processors; at least one wireless cellular interface in data communication with the one or more processors; and power management logic in data communication with the one or more processors and the wireless interface, and configured to reduce energy use associated with operation of user equipment (UE) apparatus under discontinuous reception. In one variant, the reduction is caused by at least: initialization of a tracking loop runtime, the initialization characterized by a wake-up time; decode of a logical channel associated with the network; determination of an error measure associated with the decode of the logical channel; and based on the error measure being less than a target value, reduction of the wake-up time.

A method of operating a base station in a long term evolution (LTE) cellular wireless communications network is disclosed. In one embodiment, the method comprises configuring one or more mobile devices operable within the network to conserve energy associated with a plurality of discontinuous reception cycles, the configuration causing the one or more mobile devices to: access historic performance information; reduce one or more parameters of a tracking loop at least in part on the historic performance information; operate the tracking loop according to the one or more reduced parameters; and update the historic performance information based at least in part on the reduction.

A wireless system is disclosed. In one embodiment, the system includes a plurality of base stations and a plurality of mobile user devices. The mobile user devices are configured to implement management of discontinuous channel operation.

A method of conserving electrical power in a mobile device is disclosed. In one embodiment, the method includes evaluating data relating to the prior operation of the mobile device, and selectively adjusting one or more parameters associated with radio transceiver components or operation.

Other features and advantages of the present disclosure will immediately be recognized by persons of ordinary skill in the art with reference to the attached drawings and detailed description of exemplary embodiments as given below.

All Figures © Copyright 2012 Apple Inc. All rights reserved.

DETAILED DESCRIPTION

Reference is now made to the drawings, wherein like numerals refer to like parts throughout.

Exemplary embodiments are now described in detail. While these embodiments are primarily discussed in the context of cellular networks including without limitation, third generation (3G) Universal Mobile Telecommunications System (UMTS) wireless networks, Long Term Evolution (LTE) wireless networks and other fourth generation (4G) or LTE-Advanced (LTE-A) wireless networks, it will be recognized by those of ordinary skill that the disclosed embodiments are not so limited. In fact, various disclosed features are useful in and readily adapted to any wireless network that can benefit from the adaptive wake-up procedures described herein.

Overview

Existing cellular-enabled devices (e.g., cell phones, smartphones, tablets, etc.) base so-called "wake-up" times on component tolerances. Generally speaking, these component tolerances represent the permissible limit of variation that will not significantly affect the functioning of the component. Unfortunately, wake-up times that are based on component tolerances are too generous, and thus component wake-up times can be shortened significantly. Various embodiments adaptively adjust wake-up times of digital tracking algorithms (such as timing, frequency and power control) based on key performance metrics from previous discontinuous reception (DRX) cycles.

In one exemplary embodiment, wake-up times for tracking loops are based on success/error metrics (e.g., Block Error Rate (BLER), Bit Error Rate (BER), Packet Error Rate (PER), Cyclic Redundancy Checks (CRC), etc.).

In a second embodiment, wake-up times for tracking loops are based on residual frequency and timing errors, etc.

The techniques described herein may, in some instances, have the effect of reducing component wake-up times required for discontinuous reception (DRX), and may thereby result in lower power consumption.

Methods—

Figure 1:
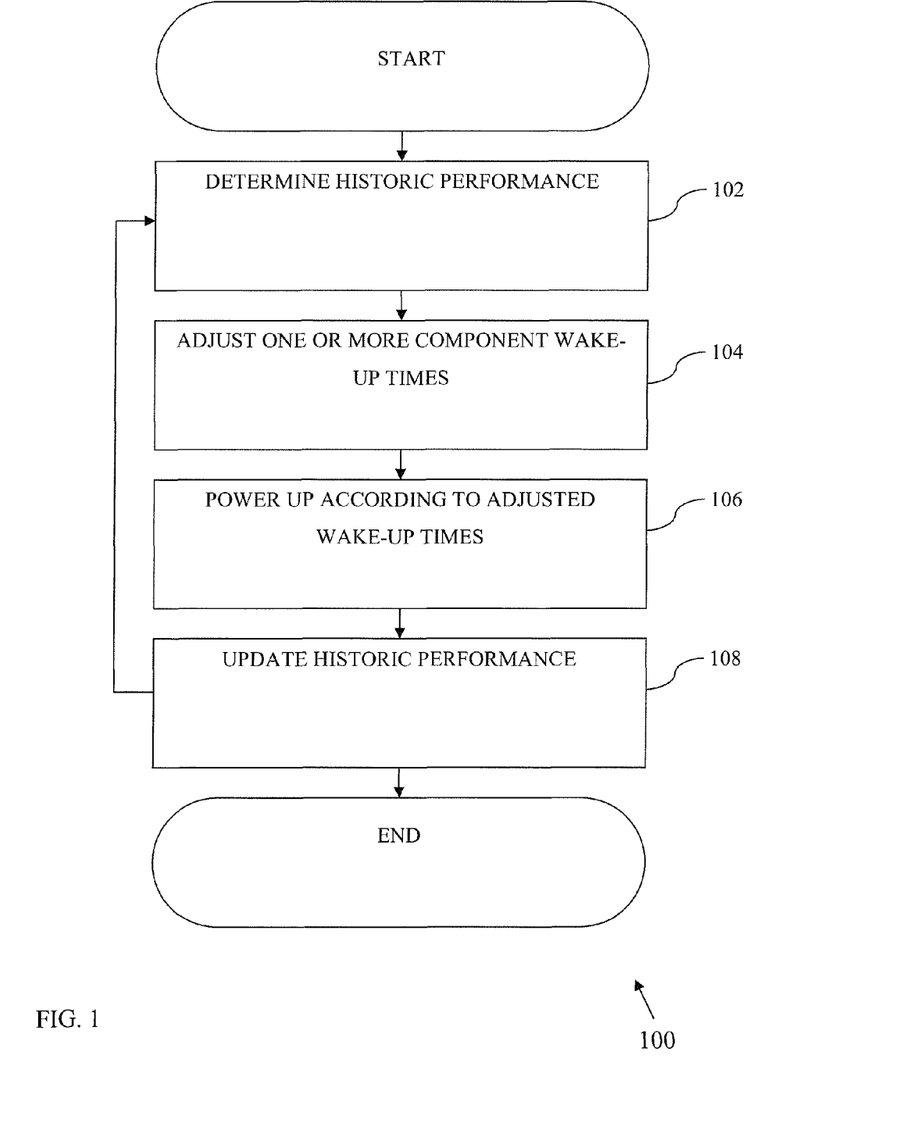
FIG. 1 is a logical flow diagram depicting one embodiment of a generalized method for improving power consumption during discontinuous reception.

FIG. 1 illustrates one embodiment of a generalized method 100 for improving power consumption during discontinuous reception (DRX). The method adjusts a wake-up time period according to previous performance. Specifically, a user equipment (UE) or other device can configure a wake-up time for a component based on a desired success rate for e.g., decoding a logical channel (such as a physical downlink control channel (PDCCH)).

Referring to FIG. 1, at step 102 of the method 100, the UE determines its historic performance. In one exemplary embodiment, performance is measured as a function of successful (or alternately unsuccessful) decoding of a signal.

In one such variant, the UE stores metrics for successful reception of a physical downlink control channel (PDCCH) or a physical downlink shared channel (PDSCH). For example, a UE may store the Block Error Rate (BLER) of the PDCCH and PDSCH for future reference as to reception performance. Other common metrics may include without limitation: bit error rates (BER), packet error rates (PER), cyclic redundancy checks (CRC), etc.

In an alternate embodiment, performance is measured as a function of a deviation from an expected value. For example, feedback loops continuously monitor an error signal to adjust an output result; this error signal may be calculated as the difference between the input signal and a modified version of the output signal (i.e., filtered and amplified by a gain). If the error signal falls outside of an expected range, the feedback loop will take longer to converge on an appropriate output result. In one such variant, the error signal history can be used as a performance metric. In alternate embodiments, the time taken to converge to an appropriate output result can be used as a performance metric.

Performance history may be compared to known or derived values (e.g., an expected value), or alternately performance history may track a change in the value from the previous value (e.g., a so-called "delta" change). Moreover, in some embodiments, performance history may include multiple values over time At step 104 of the method, the UE adjusts one or more component wake-up times based on historic performance. In one embodiment, the component is a tracking loop. Common examples of a tracking loop include for example, frequency tracking loops (FTL), time tracking loops (TTL), and power tracking loops (e.g., automatic gain control (AGC), etc.). Tracking loop wake-up time is an amount of time allotted to the tracking loop to settle into a usable state. This includes powering the various internal mechanisms of the tracking loop and allowing the mechanisms to reach internal equilibrium.

As a brief aside, during a wake-up procedure, a component (such as e.g., the aforementioned tracking loop) powers on its internals and allows them to "settle" into their initial states. For analog type components, this settling time allows various internals to flush out spurious behavior or transients caused by or related to powering on the device. For example, tracking loops may experience some spurious behavior, and oscillate or "ring". For reasons described in greater detail subsequently herein, the component can wake-up in a shorter amount of time if the resulting performance degradation is "intelligently" managed. In particular, rather than allocating a wake-up time based on component tolerances (which may include significant margin), the UE sets a wake-up time to conform to a desired performance based on the historic performance.

For example, in one exemplary embodiment, the UE adjusts the tracking loop wake-up time based on the previously stored Block Error Rate (BLER) of the PDCCH and PDSCH. If the BLER was previously acceptable, then the UE can reduce (or leave unchanged) the tracking loop wake-up times. If the BLER was previously unacceptable, then the UE can increase the tracking loop wake-up time. In other embodiments, the UE adjusts the tracking loop wake-up time based on the previously stored feedback loop error value. By continuously adjusting the tracking loop wake-up, the UE the duration of the wake-up procedure may be shortened.

At step 106, the designated component powers up according to the adjusted wake-up time. Once the component is powered up, the component measures one or more performance metrics during the DRX time slot, and at step 108 of the method 100, the UE updates its historic performance.

Power Consumption and Management in Cellular Networks—

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected to a Core Network, which includes additional controllers for resource management and in some cases access to other network systems (such as the Internet, other cellular networks, etc.).

Figure 2:
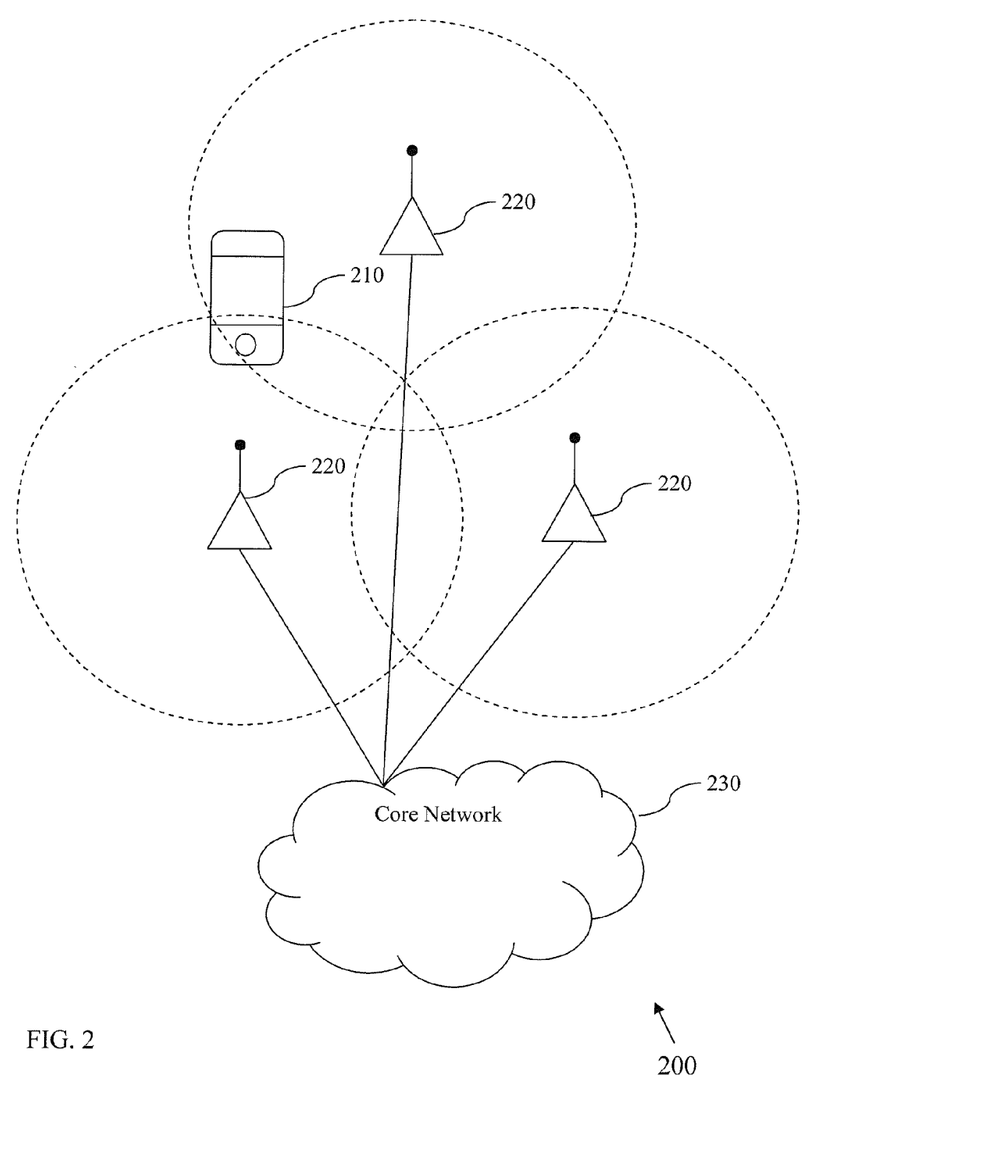
FIG. 2 is a graphical representation of one exemplary Long Term Evolution (LTE) cellular network.

FIG. 2 illustrates one exemplary Long Term Evolution (LTE) cellular network 200, with user equipments (UEs) 210, operating within the coverage of the Radio Access Network (RAN) provided by a number of base stations (BSs) 220. The LTE base stations are commonly referred to as "Enhanced NodeBs" (eNBs). The Radio Access Network (RAN) is the collective body of eNBs. The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing.

Each of the eNBs 220 are directly coupled to the Core Network 230 e.g., via broadband access. Additionally, in some networks the eNBs may coordinate with one another, via secondary access. The Core Network 230 provides both routing and service capabilities. For example, a first UE connected to a first eNB can communicate with a second UE connected to a second eNB, via routing through the Core Network 230. Similarly, a UE can access other types of services e.g., the Internet, via the Core Network 230.

In order to reduce power consumption and improve the battery life of wireless user equipment (UE), certain wireless technologies implement so-called "discontinuous reception" (DRX) and "discontinuous transmission" (DTX), During DRX and DTX operation, the UE powers down most of the radio transceiver circuitry when there are no packets to be received or transmitted. The powered down components (in "sleep mode") are powered up ("wake-up", "warm-up") at designated time intervals to e.g., receive data from the network ("listening"). During wake-up, the UE needs to prepare the radio transceiver for reception by e.g., synchronizing the UE in time and frequency to the BS, allowing feedback loops to settle, etc. DRX and DTX greatly improves device standby time, and can also provide significant reductions in power consumption during low use scenarios.

DRX can be enabled in different network connection states; these network connection states include when the UE has a radio resource connection (RRC), and when the UE is idle. During connected mode DRX operation, the UE listens to downlink (DL) packets that follow a specific identifying pattern (e.g., packet header, etc.) that has been determined by the base station (BS). In contrast, during idle mode DRX operation, the UE periodically looks for a paging message from the BS to determine if the UE needs to connect to the network and acquire the uplink (UL) timing. Within the exemplary context of LTE networks, DRX mode operation is specified for two distinct states: (i) RRC_CONNECTED, and (ii) RRC_IDLE.

In the RRC_CONNECTED state, DRX mode is enabled during an idle period of the downlink (DL) packet arrival. In the RRC_IDLE state, the UE must be paged for DL traffic (according to a paging schedule) or initiate uplink (UL) traffic by requesting a RRC connection with the serving eNB.

Currently, DRX and DTX techniques are used in several wireless technologies including, for example Universal Mobile Telecommunications System (UMTS), LTE (Long-term Evolution), and WiMAX (Worldwide Interoperability for Microwave Access). Incipient technologies will support very high data rates by using techniques that consume significant amounts of power during operation. Consequently, reducing transceiver use during inactivity will greatly improve overall transceiver power consumption. Existing schemes for DRX are controlled by the BS; i.e., the BS determines the times during DRX transmissions are sent from the BS to the UE; however, the UE independently manages its wake-up procedure to ensure that it will receive these DRX transmissions.

In order to reduce power consumption for the UE, significant research has been conducted to improve and reduce the preparation time required for wake-up. Preparation time is largely dominated by the constraints of the RF (radio frequency) transceiver and analog baseband components. For example, the transceiver requires time to re-enable components (and any associated settling time), "warm-up" clocks, processors, and digital tracking algorithms for e.g., timing, frequency and gain control, etc. Most cellular technologies experience dramatic degradation of performance if timing and frequency exceed acceptable limits and in particular, OFDM-based systems are especially sensitive to time and frequency drift.

Generally, cellular devices have been designed around "worst case" component tolerances and scenarios to reduce manufacturing and design complexity while still providing acceptable behavior. For example, existing solutions identify a time that is required to support all components for wake-up (even though many components perform significantly better); the identified value is hardcoded into the device.

Exemplary Adaptive Wake-Up Operation—

Consequently, a scheme for improving the wake-up procedure is disclosed that adaptively adjusts the wake-up time for components. Specifically, while existing solutions for the RF (radio frequency) and analog baseband component wake-up times are fixed values (based on e.g., component tolerances and/or hardware requirements), one exemplary embodiment adaptively adjusts wake-up times of digital tracking algorithms based on key performance metrics from previous DRX cycles, such as DL decoding success rate, residual frequency and timing errors, etc.

Before addressing the specifics of adaptive wake-up operation, various components and procedures useful in conjunction with various embodiments are now discussed in greater detail.

Discontinuous Reception and Transmission (DRX/DTX)—

Figure 3:
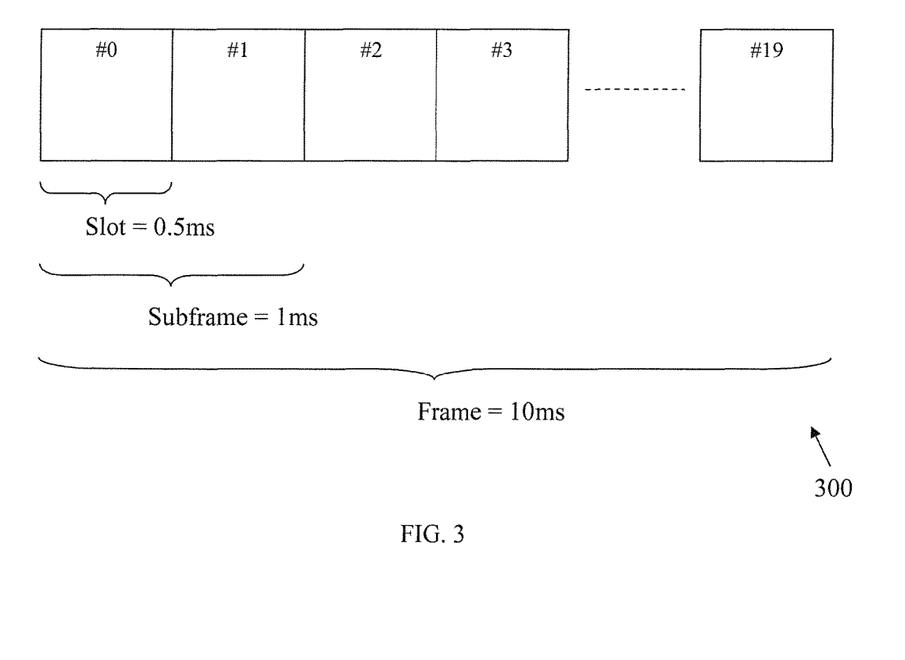
FIG. 3 is a graphical representation of one exemplary LTE frame.

The Enhanced NodeB (eNB) controls DRX operations using various timers and/or parameters that are communicated to the user equipment (UE). As a brief aside, LTE communications are conducted according to a time schedule that includes frames, subframes, and slots. One such exemplary LTE frame 300 is illustrated in FIG. 3.

When the UE has a radio resource connection, the UE can be allocated one or more time slots for communication. If a UE is enabled for DRX operation in RRC connected mode, the UE will wake-up and sleep in accordance with its resource allocations. During RRC idle mode, the UE does not have a radio resource connection. The UE will periodically wake-up to see if it is being paged within a frame of data. If the frame does not have a page for the UE, the UE will go back to sleep.

In connected mode DRX (DRX performed during the RRC_CONNECTED state), a DRX inactivity timer indicates the time in number of consecutive subframes to wait before enabling DRX.

Additionally, DRX operation is split into short cycles and long cycles. Short DRX cycles and long DRX cycles allow the eNB to adjust the DRX cycles based on ongoing application activity. For example, a UE may initially be placed in a short DRX cycle during brief lulls in activity. A DRX short cycle timer determines when to transition to the long DRX cycle; i.e., if the DRX short cycle timer expires without any UE activity, the UE transitions to the long DRX cycle which further reduces power consumption.

If no new packets are transmitted for an extended period of time after successfully receiving a packet (unsuccessful packet reception indicates a fading/broken connection which is handled with recovery/reconnection procedures), the eNB may release the RRC connection. Once the UE transitions into RRC IDLE state, idle mode DRX is enabled.

In idle mode DRX (DRX performed during the RRC_IDLE state), an ON duration timer determines the number of frames the UE can sleep through before reading the downlink (DL) control channel. Commonly used values for the ON duration timer are 1, 2, 3, 4, 5, 6, 8, 10, 20, 30, 40, 50, 60, 80, 100, and 200. During idle mode DRX, the UE only needs to monitor one paging occasion (PO) per DRX cycle, which is one subframe.

Figure 4:
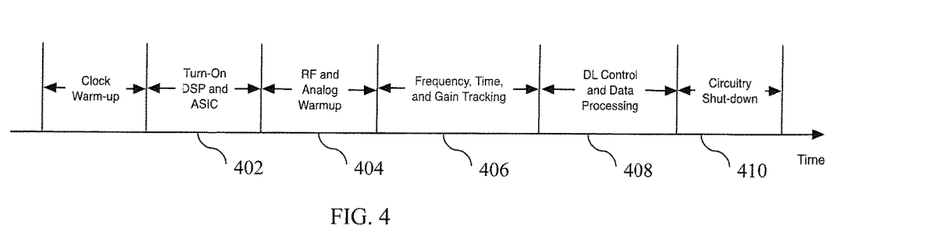
FIG. 4 is a graphical representation of a generalized timeline of an exemplary wake-up procedure executed by the UE when preparing for DRX reception.

Referring now to FIG. 4, a generalized timeline is shown that depicts the wake-up procedure executed by the UE when preparing for DRX reception.

At time 402, the transceiver clock is turned on and warmed up. The transceiver clock provides the main clocking for the digital signal processor (DSP) that drives software (SW) and firmware (FW), as well as the application specific integrated circuit (ASIC) baseband hardware. It is worth noting that while the exemplary transceiver clock is powered off during sleep mode, a low power clock remains powered on to trigger the transceiver wake-up at the designated time. The low power clock is generally specialized for operation during sleep mode (i.e., it has low power consumption, and operates at a much slower frequency than the transceiver clock).

At time 404, The RF (radio frequency) and analog baseband components are turned on. Analog baseband components may include without limitation: duplexers, diplexers, mixers, analog filters, power amplifiers (PA), analog to digital converters (ADC), and digital to analog converters (DAC), etc., all well known to those of ordinary skill in the radio frequency arts.

Once the components have been turned on, the baseband tracking loops are enabled according to an adaptive wake-up scheme described hereinafter (time 406) (see Example Operation herein). Baseband tracking loops include, for example: a frequency tracking loop (FTL), a time tracking loop (TTL), and automatic gain control (AGC). The baseband tracking loops are configured to maintain frequency, time, and power control within acceptable tolerances for communicating with the base station (BS). In LTE, the tracking loops track the downlink (DL) carrier frequency errors, timing offsets, and received power variations based on the DL reference signals (RS) (also referred to as "pilot signals").

Once the tracking loops have converged on to the appropriate frequency, timing and amplifier gains, and the radio transceiver can begin downlink (DL) processing (step 408). Within the exemplary context of LTE networks, DL processing includes, inter alia, demodulating and decoding of the appropriate data and control channels. In LTE, the radio transceiver demodulates and decodes a Physical Downlink Control Channel (PDCCH); if the UE is so directed (e.g., if the UE is being paged, etc.), then the UE will additionally decode the Physical Downlink Shared Channel (PDSCH) (the PDSCH has both control and data payloads).

After the UE has finished decoding appropriate control and data information, the UE can go back to sleep (410). Most of the transceiver circuitry will be turned off including the RF, digital baseband, and processors. Only a small portion of the circuitry and the low power clock remains powered to maintain coarse tracking of the carrier timing. This "coarse" timing ensures that the timing variation will be limited to a relatively small range that can be corrected during wake-up of the next DRX cycle.

A discussion of various exemplary baseband tracking loops follows.

Frequency Tracking—

The UE tracks the frequency error based on the frequency of reference signals (RS) that are transmitted by the eNB. The frequency error is used as feedback for a frequency rotator. If left unchecked, carrier frequency error degrades the UE's receiver performance; at excessive levels, frequency error affects the orthogonality of the received OFDM (orthogonal frequency division multiplexing) signals, thus causing significant inter-channel interference (ICI) which deteriorates system performance dramatically.

Figure 5:
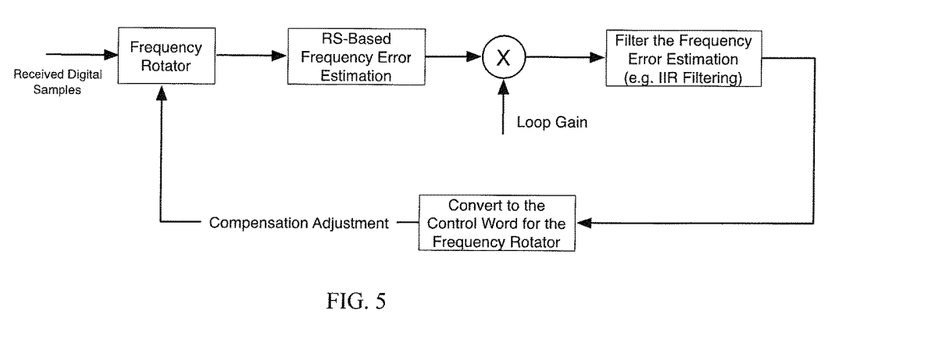
FIG. 5 is a logical block diagram illustrating one exemplary frequency tracking loop (FTL).

FIG. 5 illustrates one such frequency tracking loop (FTL) using a frequency rotator for frequency compensation. As shown, the UE performs channel estimation on known reference signals (RS); the channel estimation calculates a channel impulse response (CIR) for each RS. It is generally true that the channel path is the same for adjacent RS signals on the same antenna (i.e., the CIR is predominantly affected by the wireless channel experienced for each TX-RX antenna pair, and can be assumed to be static within a short time period that is much less than the channel correlation-time). Consequently, a CIR of a first RS with the CIR of an adjacent RS will differ only by a minor difference in phase that is attributable to the carrier frequency error experienced during transmission. The phase difference can be determined by correlating the first CIR with the adjacent CIR; the resultant phase difference can be used to calculate the frequency error.

As shown in FIG. 5, the frequency error is multiplied by the FTL loop gain ($\alpha_{FTL}$); the loop gain determines how fast and accurately the loop converges to the correct frequency value. If the loop gain is too large, the loop may track to instantaneous noise instead of the true frequency errors; if the loop gain is too small, it may take a long time to converge to the true frequency error.

The UE should track the carrier frequency error instead of Doppler frequency shift. Doppler frequency shift is dependent on the movement of the UE; thus, Doppler frequency shift has different characteristics than carrier frequency error (which is predominantly caused by component effects). As shown, the frequency estimation is filtered (e.g., via an infinite impulse response (IIR) filter) to remove Doppler effects, thus providing stable frequency control. Finally, the output of the frequency tracking loop is provided as feedback to the frequency rotator.

It will be appreciated by those of ordinary skill in the related arts that the foregoing discussion of a frequency rotator for frequency tracking loop control is purely illustrative. Yet other forms of frequency adjustment include, for example, e.g., a crystal oscillator (XO) that adjusts for frequency error by adjusting a voltage, etc. Such substitution may be easily made by one of ordinary skill in the related arts, given the contents of the present disclosure.

Time Tracking—

The TTL tracks the change in transmission time between the UE and the eNB. The time delay (or delay spread) is used to determine the optimal window of data samples to process with a Fast Fourier Transform (FFT) to extract the OFDM signaling. As with frequency error, timing error contributes to overall performance degradation. Large timing errors can cause improper selection of the FFT window, and reduce the overall Carrier-to-Interference plus Noise Ratio (CINR) of the received signal. For example, when the delay spread has been estimated reliably and is known to be smaller than the cyclic prefix (CP) length (the CP is a guard interval between FFT symbols), the FFT window can be selected to span from CP to CP, thus fully encompassing the FFT symbol. By capturing the entire FFT symbol, the FFT window can avoid inter-channel interference (ICI) and inter-symbol-interference ISI, which allows the receiver to completely recover the FFT symbol. However, if the delay spread is longer than the CP, then the FFT window will include samples of the previous or subsequent OFDM symbol in the FFT, which will cause ISI and/or ICI.

Figure 6:
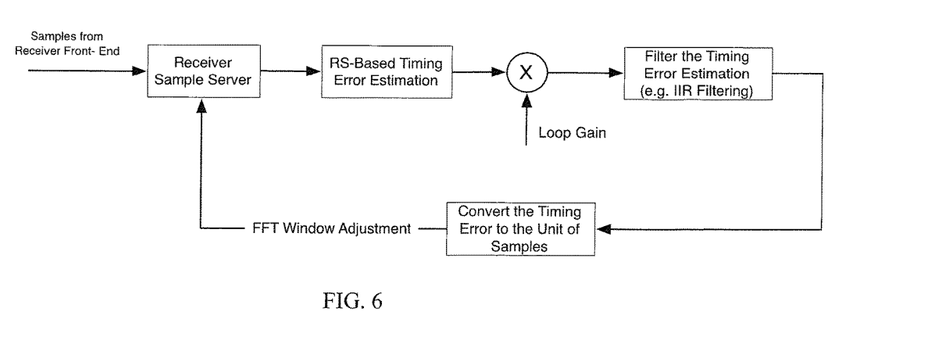
FIG. 6 is a logical block diagram illustrating one exemplary time tracking loop (TTL).

Referring now to FIG. 6, a time tracking loop (TTL) is illustrated. The TTL is configured to optimize the position of the FFT window as a function of the channel multi-path taps, so as to maximize the CINR ratio. As shown, a timing error is calculated from the channel impulse response (CIR); i.e., how much time shift has the reference signal (RS) CIR changed, in view of the previous RS CIR. The timing error is multiplied by a TTL loop gain ($\alpha_{TTL}$); the loop gain determines how fast and accurately the loop converges to the correct time value. Similar to the FTL loop, the resulting value is filtered, and used as feedback for the FFT window location. By continuously tracking the delay with the TTL, timing is optimized for improved CINR for each OFDM symbols.

Automatic Gain Control—

The receiver automatic gain control (AGC) algorithm is designed to maintain a constant signal power at the input to the demodulator, which is implemented through the mechanism of two loops: an outer loop, and an inner loop.

The outer loop controls the low-noise amplifier (LNA) gain state in RF (i.e., by increasing or decreasing amplifier gain); the LNA gain state can compensate for coarse gain variations. In contrast, the inner loop estimates and adjusts the digital variable gain control (DVGA) to maintain a constant set-point for the signal power at the input to the demodulator. The DVGA can perform fine adjustment in the digital domain. The AGC loops are implemented in a similar fashion to the FTL and TTL control loops (i.e., the input is measured for power, filtered and then fed back for adjustment). For illustrative purposes, the AGC loop gains are $\alpha_{AGC}$ for both inner and outer loops.

While the foregoing descriptions of the frequency tracking loop, time tracking loop, and automatic gain control (AGC) loop have been provided herein, it is readily appreciated that these baseband tracking loops are merely illustrative of the many different types of tracking loops or other functions that are encompassed within the scope of the present disclosure. For example in addition to the foregoing, one of ordinary skill in the related arts will readily recognize that tracking loops are widely used in multiple wireless systems for a variety of tasks, including without limitation accurately reproducing e.g., time, frequency, phase, delay, gain, etc.

Example Operation—

In prior art solutions, a coarse low power sleep clock remains on during the DRX sleep period to keep track of timing. During the wake-up procedure, the baseband tracking circuitry powers on from the completely powered off state based on the coarse low power sleep clock. For this reason, the initial timing error and frequency error can be large at the start of DRX wake-up. If the tracking loops do not converge within a reasonable range, the DL packets cannot be properly demodulated and decoded. Also, since the wireless channel can vary dramatically from the last wake-up period, there may be very large power swings in waking the receiver back up.

For these reasons, in order to have good DRX reception, most transceiver designs consume a significant amount of power while waking up the tracking loops. Moreover, within prior art solutions, the time budget for waking up the baseband tracking loops is based on the worst-case component tolerances, so as to ensure successful decoding of the downlink (DL) transmissions during the DRX cycle.

In one exemplary embodiment, the adaptive wake-up of tracking algorithms during the DRX operation is based on physical layer metrics from previous DRX cycles. For example, in one instance, the time budgeted for waking up the baseband tracking loops is based on the block error rates (BLER) of physical downlink control channel and physical downlink shared channel decoded during the previous DRX cycle.

More generally, various disclosed embodiments are directed to adaptively shortening the time for waking up components based on the likelihood of successfully decoding a message (rather than conforming to a fixed e.g., worst-case component tolerance). In fact, even if the tracking loops don't have enough time to completely converge, it is likely that the DRX messaging (e.g., transmitted on the Physical Downlink Control Channel (PDCCH) and Physical Downlink Shared Channel (PDSCH)) can still be correctly decoded due to the error protection coding.

Multiple useful variants are contemplated. In one such variant, the time budgeted for wake-up is based on a decoding success ratio (e.g., the BLER) for the Physical Downlink Control Channel (PDCCH) and Physical Downlink Shared Channel (PDSCH) during previous DRX cycles. For example, if the ratio of successful decodes remains above a target band, the baseband tracking loops can be shortened. If the ratio of successful decodes falls within a target band, then time values for the baseband tracking loop values are sufficient. Otherwise, if the ratio of successful decodes exceeds acceptable rates, then the baseband tracking loops need more time to warm up.

In other variants, the residual tracking loop error for the previous DRX cycle can be used to determine the approximate amount of time for warm up. For example, if the tracking loops were making significant error corrections during previous tracking loops, then the tracking loops should be allotted more warm-up time. If the tracking loops do not accumulate significant errors, then the existing tracking loop performance is satisfactory, and tracking loop time may be shortened.

Similarly, energy estimation from previous DRX cycles can be used to determine if (for example) the low noise amplifier (LNA) is operating in a non-linear region that may lead to saturation.

In still other variants, the signal quality references can also be used as a metric for adaptive wake-up. For example, a higher estimated Signal to Noise Ratio (SNR) at the end of the previous DRX cycle indicates that the tracking loops had been operating within acceptable limits, and the wake-up time of the tracking loops in the current DRX cycle can be reduced accordingly. Similarly, a lower estimated SNR at the end of the previous DRX cycle may indicate that the tracking loop time needs to be increased.

Other variants for shortening wake-up times based on previous performance will be made apparent to one of ordinary skill, in view of the present disclosure.

Figure 7:
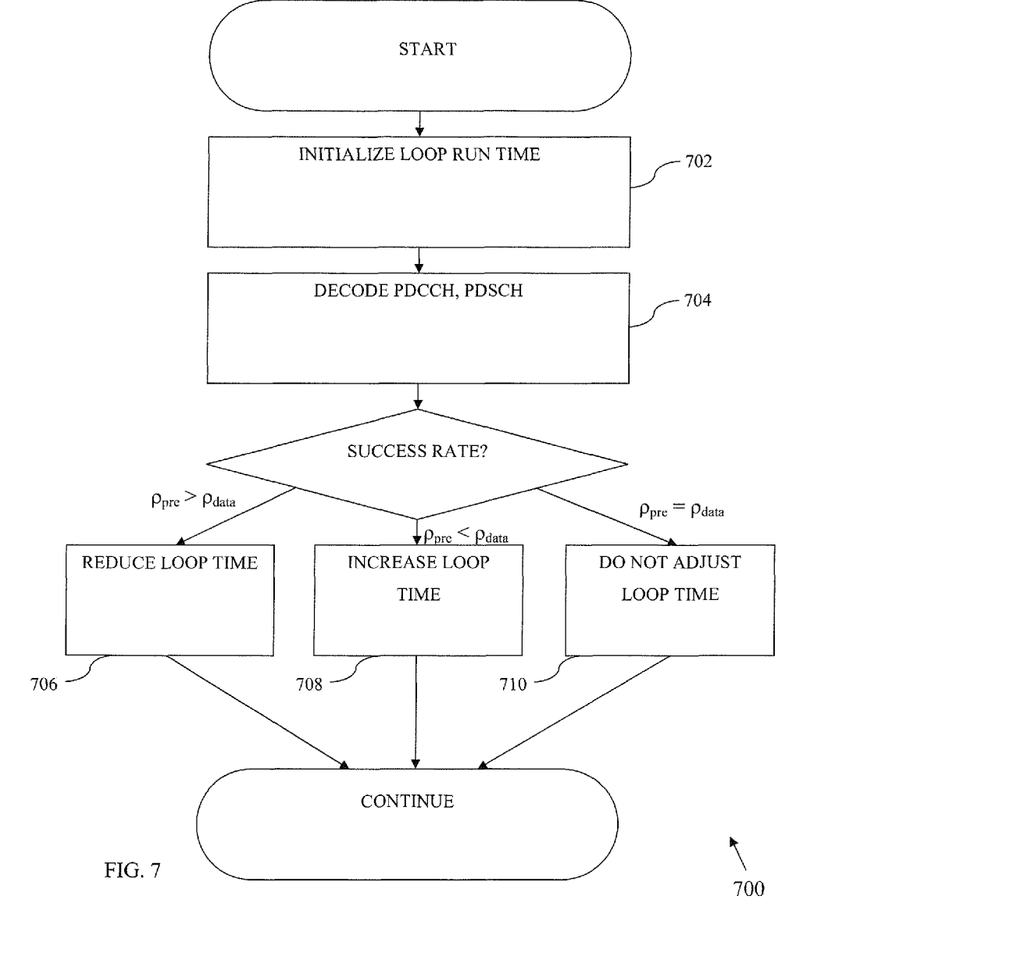
FIG. 7 is a logical flow diagram illustrating a first exemplary scheme for configuring a baseband tracking loop.
Figure 8:
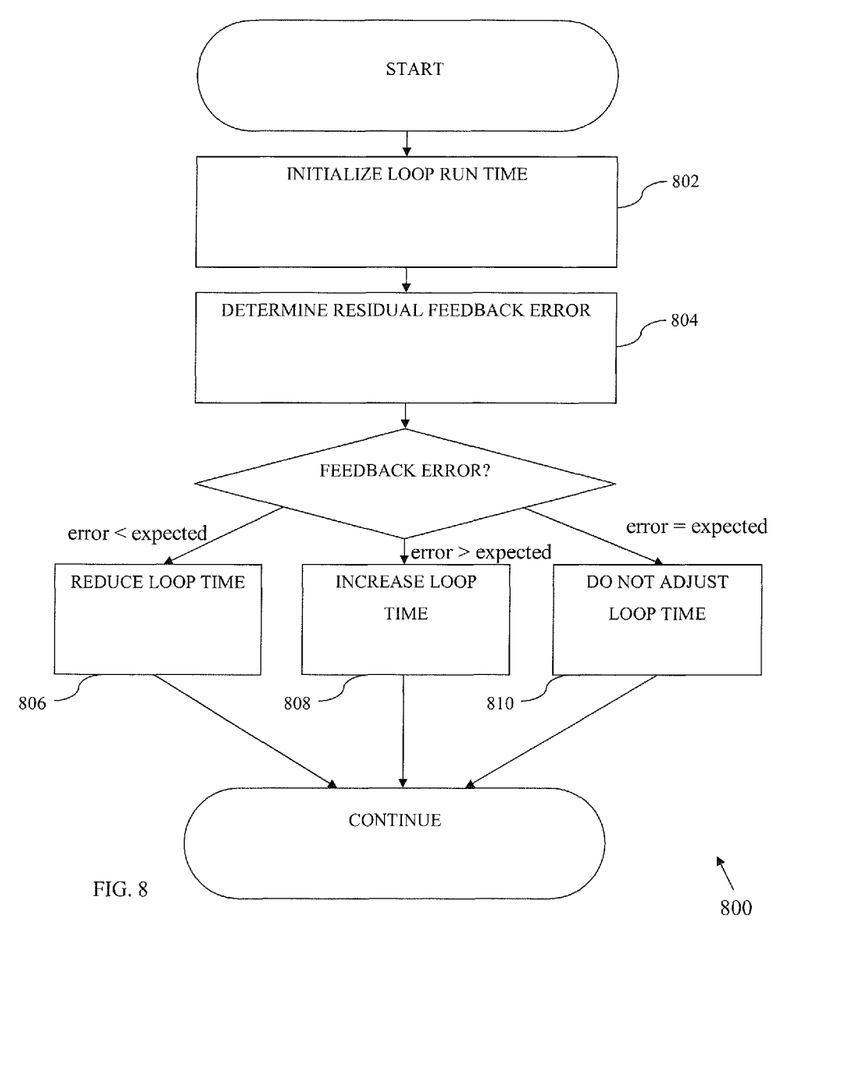
FIG. 8 is a logical flow diagram illustrating a second exemplary scheme for configuring a baseband tracking loop.

Referring now to FIGS. 7 and 8, two different schemes for configuring baseband tracking loops are disclosed.

FIG. 7 illustrates a first scheme for configuring a baseband tracking loop. As a brief aside, the baseband tracking loop can be parameterized with a time constant value that is derived from the loop gain to represent how long the loop takes to stabilize. In one embodiment, a baseband tracking loop that has a one-tap infinite impulse response (IIR) loop, is configured with a time constant that is the inverse of the loop gain. It is worth noting that configuring the baseband tracking loop for a run-time that is significantly less than the time constant may create sizable residual errors.

In one exemplary implementation, the UE adaptively reduces the wake-up time for the tracking loops based on a desired success rate for the physical downlink shared channel (PDSCH) represented as P % (95% for example). The baseband tracking loops are set to a wake-up time value (e.g., $t^*_{FTL}$, $t^*_{TTL}$, and $t^*_{AGC}$ for the frequency tracking loop (FTL), time tracking loop (TTL) and automatic gain control (AGC), respectively) during each DRX cycle. As shown in FIG. 7, based on the resulting PDSCH results, the wake-up time values are increased, decreased, or left unchanged.

At step 702 of the method 700, the UE initializes the loop running times (e.g., $t_{FTL}$, $t_{TTL}$, and $t_{AGC}$) to the corresponding times ($t^*_{FTL}$, $t^*_{TTL}$, and $t^*_{AGC}$) which correspond to a P % success rate for the PDSCH. These loop running times may be initialized from pre-determined values, historically determined values, calculated values, etc.

At step 704, the UE decodes the PDCCH and PDSCH. During the decoding of the PDCCH and PDSCH, a running count of errors (e.g., bit error rate (BER), packet error rate (PER), block error rate (BLER), etc.) is converted to a success rate ($P_{pre}$%) and stored for later reference. While the PDCCH and PDSCH experience some degree of error, the PDCCH and PDSCH are robustly coded and can be correctly received in the presence of errors.

Furthermore, it is additionally noted that even though the errors in the PDCCH and PDSCH may be caused by many factors other than timing, frequency, or gain errors, the PDCCH and PDSCH can only be received successfully if the tracking loops are operating properly (where the wake-up time was sufficient).

During the next DRX cycle, the UE executes one of steps 706, 708 and 710, based on the previously stored success rate.

At step 706, the values for $t^*_{FTL}$, $t^*_{TTL}$, and $t^*_{AGC}$ are adjusted based on the stored success rate ($P_{pre}$%) being greater than the desired success rate ($P_{data}$%). In other words, if the previous performance is better than required, the UE can reduce the tracking loop wake-up time. As shown in EQN. 1, the wake-up times for the FTL, TTL, and AGC are reduced by a factor $\beta<1$.

$$t_{FTL}=\beta \times t_{FTL}, t_{TTL}=\beta \times t_{TTL}, \text{ and } t_{AGC}=\beta \times t_{AGC}; \quad \text{(EQN. 1)}$$

where: $\beta<1$.

In contrast to step 706, at step 708 of the method, the values for $t^*_{FTL}$, $t^*_{TTL}$, and $t^*_{AGC}$ are adjusted based on the stored success rate ($P_{pre}\%$) being lower than the desired success rate ($P_{data}\%$). In other words, if the previous performance is worse than is required, the UE should increase the tracking loop wake-up time. As shown in EQN. 2, the wake-up times for the FTL, TTL, and AGC are increased by a factor $\lambda>1$.

$$t_{FTL}=\lambda \times t_{FTL}, t_{TTL}=\lambda \times t_{TTL}, \text{ and } t_{AGC}=\lambda \times t_{AGC}; \quad \text{(EQN. 2)}$$

where: $\lambda>1$.

At step 710, the values for $t^*_{FTL}$, $t^*_{TTL}$, and $t^*_{AGC}$ are left unchanged if the stored success rate ($P_{pre}\%$) equals the desired success rate ($P_{data}\%$). It is additionally noted that minor variations in success rate may be considered negligible. Thus, in some cases if the stored success rate is within a tolerable range of the desired success rate, the UE does not adjust the tracking loop times.

The parameters $\beta$ and $\lambda$ can be different for different DRX modes. For example, if errors are detected in idle mode DRX, then the UE may opt to spend more time in wake-up to recover for the next DRX cycle, whereas for connected mode DRX the UE can be more forgiving. Moreover, while the foregoing equations (EQN. 1, EQN. 2) have used proportional adjustment (a multiplier), in other variations the adjustment may be fixed (e.g., increment, decrement), a non-linear function (e.g., a look-up table), etc. Other practical limitations may also be considered. For example, in certain systems, the tracking loop wake-up time may be kept within a reasonable range by using an upper and a lower bounded value.

Referring now to FIG. 8, a second scheme for configuring a baseband tracking loop is depicted. In this scheme, the residual frequency and timing errors from previous DRX cycles is used to determine an appropriate adjustment to the tracking loop running time for the current DRX cycle. The wake-up time can be increased for larger residual errors or decreased for smaller residual errors. Unlike the first scheme described above, the residual frequency and timing errors are captured from the feedback loop process (as opposed to an error rate that is determined during decoding). For example, based on empirical data (e.g., historical data) of DRX performance, a residual expected frequency and timing errors ($\bar{f}_{Res}, \bar{t}_{Res}$) of the baseband tracking loops correspond to a PDSCH decoding success rate that exceeds $P_{data}\%$.

At step 802 of the method 800, the UE initializes the wake-up loop times (i.e., $t_{FTL}$, $t_{TTL}$, are set to the initial values $t^*_{FTL}$, $t^*_{TTL}$).

At step 804, the UE determines a residual frequency and timing error ($\bar{f}_{Res}, \bar{t}_{tees}$). The UE also retrieves the expected residual frequency and timing errors of corresponding to the PDSCH decoding success rate $P_{data}\%$ to determine the appropriate adjustment.

During the next DRX cycle, the UE executes one of steps 806, 808 and 810, based on the previously stored residual frequency and timing error.

At step 806, if both frequency and timing residual errors are smaller than the expected residual errors ($f_{Res}<\bar{f}_{Res}$ and $t_{Res}<\bar{t}_{Res}$), then the UE can decrease the tracking loop wake-up times (see for example, EQN. 1).

At step 808, if either the frequency or the timing residual errors are greater than the expected residual errors $f_{Res}>\bar{f}_{Res}$ or $t_{Res}>\bar{t}_{Res}$ then the UE must increase the tracking loop wake-up times (see for example, EQN. 2).

At step 810, the wake-up values are left unchanged if the stored success rate residual errors equal or are within an acceptable tolerance of the expected values.

Those of ordinary skill in the related arts will recognize (in view of the foregoing disclosure) that various other optimizations to wake-up algorithms are possible consistent with the present disclosure. In one embodiment, the adaptive wake-up algorithm can be optimized by jointly using residual loop errors and success (or error rates) from previous DRX cycles. Such a hybridized scheme (i.e., of the first and second schemes of FIG. 7 and FIG. 8) may be more complex in implementation than the first and second schemes alone, but may also provide benefits in certain applications as compared to either alone.

In another such embodiment, the changes to loop wake-up times may be different according to different thresholds. For example, the loop wake-up time increment may be increased when the frequency and timing errors are greater than a first upper threshold. Similarly, the loop wake-up time increments can be decreased when the frequency and timing errors are smaller than a second lower threshold. The amount of the loop gain increase or decrease can be determined by calculating the time constant that is needed to pull-in the errors within the current DRX cycle.

Apparatus—

Figure 9:
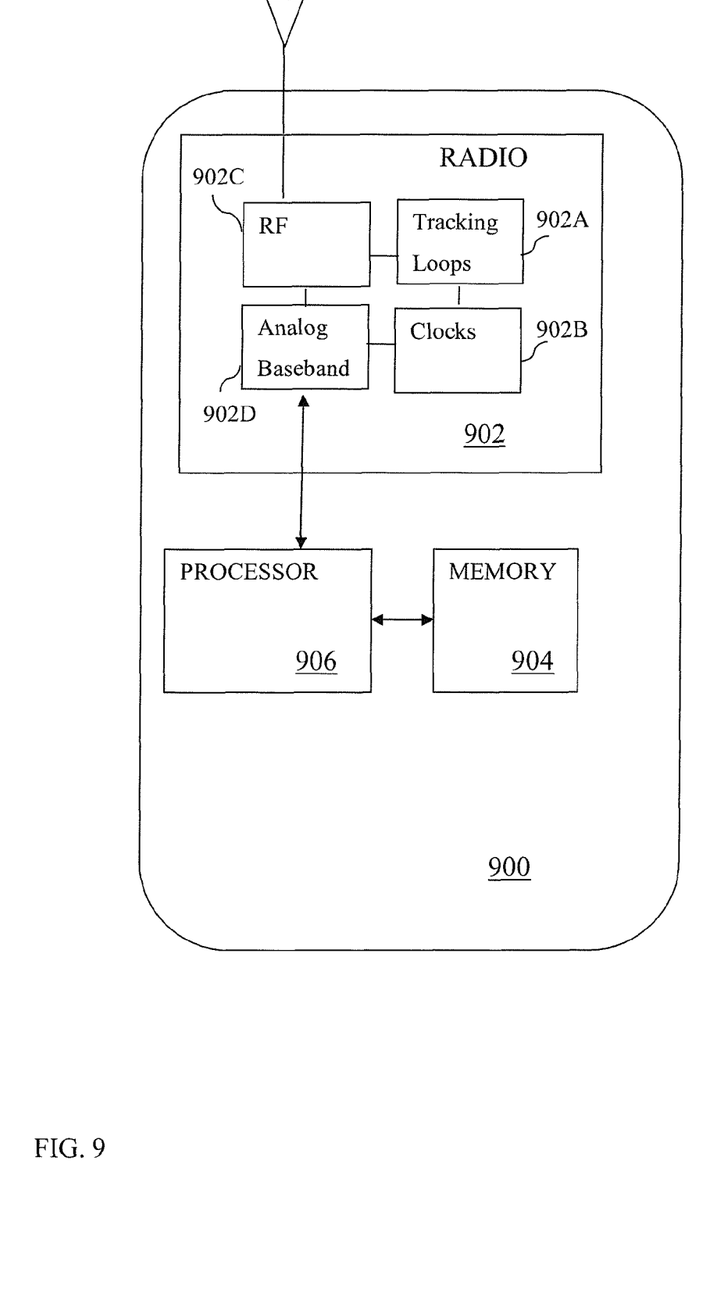
FIG. 9 illustrates one exemplary user device apparatus.

Referring now to FIG. 9, an exemplary user device apparatus 900 with reduced power consumption during discontinuous reception is illustrated. While one specific device configuration and layout is shown and discussed herein, it is recognized that many other configurations may be readily implemented by one of ordinary skill given the present disclosure, the apparatus 900 of FIG. 9 being merely illustrative of the broader principles of the present disclosure.

The apparatus 900 of FIG. 9 includes one or more radio transceivers 902, a computer readable memory 904, and a processing subsystem 906.

The processing subsystem 906 includes one or more of central processing units (CPU) or digital processors, such as a microprocessor, digital signal processor, field-programmable gate array, RISC core, or plurality of processing components mounted on one or more substrates. The processing subsystem is coupled to computer readable memory 904, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/ FPMS, RLDRAM, SRAM, "flash" memory (e.g., NAND/ NOR), and PSRAM. The processing subsystem may also comprise additional co-processors, such as a dedicated graphics accelerator, network processor (NP), or audio/ video processor. As shown processing subsystem 906 includes discrete components; however, it is understood that in some embodiments they may be consolidated or fashioned in a SoC (system-on-chip) configuration.

In one exemplary embodiment, the memory is configured to store performance information. Performance information may broadly include information indicative of successful (or alternately unsuccessful) decoding of a signal. For example, in one variant performance information include metrics for successful reception of a physical downlink control channel (PDCCH) or a physical downlink shared channel (PDCCH). Common metrics may include without limitation: block error rates (BLER), bit error rates (BER), packet error rates (PER), cyclic redundancy checks (CRC), etc.

The processing subsystem 906 is adapted to receive one or more data streams from a radio transceiver 902. The radio transceiver in this exemplary embodiment generally comprises a cellular radio transceiver with one or more components having an adjustable wake-up time. Common examples of such components include for example: tracking loops 902A, clocks 902B, RF components 902C and analog baseband components 902D. Common examples of tracking loops include, without limitation, time tracking loops, frequency tracking loops (e.g., automatic frequency control (AFC)), gain tracking loops (e.g., automatic gain control (AGC)), etc. Clock components may include e.g., crystal oscillators (XO), voltage controlled XO (VCXO), temperature controlled XO (TCXO), and VCTCXO, etc. Various examples of RF and analog baseband components may include without limitation: duplexers, diplexers, mixers, analog filters, power amplifiers (PA), analog to digital converters (ADC), and digital to analog converters (DAC), etc.

Myriad other schemes for adaptive wake-up will be recognized by those of ordinary skill given the present disclosure.

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles described herein.

What is claimed is:

1. A long term evolution (LTE)-enabled wireless network user equipment (UE) mobile radio communications apparatus comprising:
a processor;
a wireless interface; and
power management logic in communication with the processor and the wireless interface and configured to:
initialize a tracking loop runtime, the initialization characterized by a wake-up time length of the tracking loop runtime, wherein the tracking loop runtime is associated with one or more of a frequency tracking loop (FTL), a time tracking loop (TTL), or a power tracking loop, and wherein the wake-up time length specifies a length of time to allow the associated one or more tracking loops to settle into a usable state;
decode a logical channel associated with the network;
determine an error measure associated with the decode of the logical channel; and
based on the error measure being less than a target value, reduce the wake-up time length of the tracking loop runtime.

2. The apparatus of claim 1, wherein the power management logic is further configured to, when the error measure is greater than a target value, increase the wake-up time length.

3. The apparatus of claim 1, wherein the logical channel comprises one of physical downlink control channel (PDCCH), or physical downlink shared channel (PDSCH).

4. The apparatus of claim 3, wherein the error measure comprises any of block error rate (BLER), bit error rate (BER), packet error rate (PER), and Cyclic Redundancy Checks (CRC).

5. A method of operating a base station in a long term evolution (LTE) cellular wireless communications network, the method comprising:
configuring one or more mobile devices operable within the network to conserve energy associated with a plurality of discontinuous reception cycles, the configuration causing the one or more mobile devices to:
access historic performance information associated with communication of the respective mobile device with the LTE cellular wireless communications network;
reduce one or more parameters of a tracking loop at least in part on the historic performance information, wherein reducing one or more parameters of the tracking loop comprises at least reducing a wake-up time length of the tracking loop, wherein the tracking loop comprises one or more of a frequency tracking loop (FTL), a time tracking loop (TTL), or a power tracking loop, wherein the wake-up time length specifies a length of time to allow the tracking loop to settle into a usable state;
operate the tracking loop according to the one or more reduced parameters; and
update the historic performance information based at least in part on the reduction.

6. The method of claim 5, wherein the configuring the one or more mobile devices enables the one or more mobile devices to operate in radio resource connection (RRC) idle mode within one or more of the plurality of discontinuous reception cycles, the operation in RRC idle mode comprising:
entry into a low power state characterized by powering-off the tracking loop;
based on an event, power-up of the tracking loop and configuration of a tracking loop wake-up time length;
decode of a paging packet, the decode of the paging packet characterized by an error measure;
comparison of the error measure to another error measure of the historic performance information; and
based on the error measure being less than the another error measure, reduction of the wake-up time length.

7. The method of claim 5, wherein configuring the one or more mobile devices enables the one or more mobile devices to communicate with the base station in radio resource connection (RRC) connected mode using one or more of the plurality of discontinuous reception cycles, the communication comprising:
decoding a downlink (DL) packet, the decoding characterized by an error measure;
entering a low power state characterized by powering-off the tracking loop;
based on an event, powering-up the tracking loop and configuring tracking loop wake-up time length;

decoding another DL packet, the decode another DL packet characterized by another error measure; and based on the another error measure being less than the error measure, reducing the wake-up time length;

wherein the historic performance information comprises at least one of the error measure and the another error measure.

8. A wireless base station apparatus, comprising:

one or more processors;

at least one wireless cellular interface in data communication with the one or more processors; and power management logic in data communication with the one or more processors and the wireless interface, and configured to reduce energy use associated with operation of user equipment (UE) apparatus under discontinuous reception, by at least:

initialization of a tracking loop runtime, the initialization characterized by a wake-up time length of the tracking loop runtime, wherein the tracking loop runtime is associated with one or more of a frequency tracking loop (FTL), a time tracking loop (TTL), or a power tracking loop, and wherein the wake-up time length specifies a length of time to allow the associated one or more tracking loops to settle into a usable state;

decode of a logical channel associated with the network;

determination of an error measure associated with the decode of the logical channel; and based on the error measure being less than a target value, reduction of the wake-up time length of the tracking loop runtime.

9. A non-transitory, computer readable apparatus comprising a plurality of computer readable instructions configured to, when executed by a processor in a base station device in a long term evolution (LTE) cellular wireless communications network, cause the base station device to:

configure one or more mobile devices operable within the network to conserve energy associated with a plurality of discontinuous reception cycles, the configuration causing the one or more mobile devices to:

access historic performance information associated with communication of the respective mobile device with the LTE cellular wireless communications network;

reduce one or more parameters of a tracking loop at least in part on the historic performance information, wherein reducing one or more parameters of the tracking loop comprises at least reducing a wake-up time length of the tracking loop, wherein the tracking loop comprises one or more of a frequency tracking loop (FTL), a time tracking loop (TTL), or a power tracking loop, and wherein the wake-up time length specifies a length of time to allow the tracking loop to settle into a usable state;

operate the tracking loop according to the one or more reduced parameters; and update the historic performance information based at least in part on the reduction.

10. The apparatus of claim 9, wherein the one or more parameters comprises an initialization time of the tracking loop.

11. The apparatus of claim 9, wherein configuring the one or more mobile devices enables the one or more mobile devices to operate in radio resource connection (RRC) idle mode within one or more of the plurality of discontinuous reception cycles, the operation in RRC idle mode comprising:

entry into a low power state characterized by powering-off the tracking loop;

based on an event, power-up of the tracking loop and configuration of tracking loop wake-up time length;

decode of a paging packet, the decode of the paging packet characterized by an error measure;

comparison of the error measure to another error measure of the historic performance information; and based on the error measure being less than the another error measure, reduction of the wake-up time length.

12. The apparatus of claim 9, wherein configuring the one or more mobile devices enables the one or more mobile devices to communicate with the base station in radio resource connection (RRC) connected mode using one or more of the plurality of discontinuous reception cycles, the communication comprising:

decoding a downlink (DL) packet, the decoding characterized by an error measure;

entering a low power state characterized by powering-off the tracking loop;

based on an event, powering-up the tracking loop and configuring tracking loop wake-up time length;

decoding another DL packet, the decode another DL packet characterized by another error measure; and based on the another error measure being less than the error measure, reducing the wake-up time length;

wherein the historic performance information comprises at least one of the error measure and the another error measure.

* * * * *